(12) United States Patent
Taguchi

(10) Patent No.: US 6,344,765 B2
(45) Date of Patent: *Feb. 5, 2002

(54) SIGNAL TRANSMISSION WITH REDUCED RINGING OF SIGNALS

(75) Inventor: Masao Taguchi, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/461,722

(22) Filed: Dec. 16, 1999

Related U.S. Application Data

(62) Division of application No. 08/813,358, filed on Mar. 7, 1997.

(30) Foreign Application Priority Data

Aug. 29, 1996 (JP) .............................................. 8-228997

(51) Int. Cl.$^7$ .............................. H03L 5/00; H03K 3/00
(52) U.S. Cl. ........................ 327/333; 327/108; 326/30; 326/86
(58) Field of Search ................................. 327/333, 107, 327/437; 326/30, 26, 27, 68, 119

(56) References Cited

U.S. PATENT DOCUMENTS

| | | | | |
|---|---|---|---|---|
| 4,808,853 A | | 2/1989 | Taylor | 326/119 |
| 5,512,853 A | * | 4/1996 | Ueno et al. | 327/333 |
| 5,548,226 A | | 8/1996 | Takekuma et al. | 326/119 |
| 5,617,045 A | * | 4/1997 | Asahina | 327/333 |
| 5,644,217 A | * | 7/1997 | Kusaba | 323/315 |
| 5,781,026 A | * | 7/1998 | Chow | 327/26 |
| 5,801,564 A | * | 9/1999 | Gasperik | 327/333 |

* cited by examiner

Primary Examiner—Dinh T. Le
(74) Attorney, Agent, or Firm—Arent Fox Kintner Plotkin & Kahn PLLC

(57) ABSTRACT

A signal-transmission system includes signal-transmission lines connected to a terminal voltage via terminal resistances, open-drain-type transistors outputting signals to the signal-transmission lines, branch lines stemming from the signal-transmission lines to connect the open-drain-type transistors with the signal-transmission lines, and insertion resistances inserted in the branch lines in proximity of the signal-transmission lines.

1 Claim, 12 Drawing Sheets

SIGNAL TRANSMISSION WITH REDUCED RINGING OF SIGNALS

This is a divisional application of U.S. patent application Ser. No. 08/813,358 filed Mar. 7, 1997.

BACKGROUND OF THE INVENTION

1. Field of the Invention

The present invention generally relates to data-transmission systems using buses, and particularly relates to a data-transmission system employing a high-speed bus provided with termination.

2. Description of the Related Art

As a processing speed of microprocessors increases, increased speed of data transmission is required between LSI chips employing an increased frequency of transmission signals. A TTL level and a CMOS level, which are input/output signal levels used in the related-art technology, suffer detrimental effects of signal reflections and crosstalk when a signal frequency exceeds about 50 MHz. In such a case, error-free data transmission becomes difficult.

In order to obviate this problem, input/output interfaces such as CTT (center tapped termination) and GTL (gunning transceiver logic) have been created, which use small-amplitude signals which have signal levels smaller than 1 V.

FIG. 1 is an illustrative drawing showing a GTL system. The GTL system of FIG. 1 includes a bus 10 having characteristic impedance $Z_0$, termination resistances Rt each connecting a respective end of the bus 10 to a termination voltage Vtt, stubs or branch lines 11 each having a characteristic impedance $Z_1$, and stemming from the bus 10, and devices 20 connected at a respective end of each stub 11, such devices including memories, controllers, etc. Here, the termination voltage Vtt is 1.2 V, and the termination resistance Rt is 50 Ω.

An I/O node of the device 20 connected to the stub 11 has connections to an output circuit and an input buffer circuit in the device 20. The output circuit of the device 20 includes a damping circuit 21 and a driver transistor 22. The input buffer circuit of the device 20 includes a current-mirror-type differential amplifier comprising transistors 23 through 27, and includes an inverter 28. The current-mirror-type differential amplifier makes a comparison between a signal voltage applied to the I/O node and a reference voltage Vref, and outputs a low voltage level to the inverter 28 if the signal voltage is higher than the reference voltage Vref. If the signal voltage is lower than the reference voltage Vref, the current-mirror-type differential amplifier supplies a high voltage level to the inverter 28. The inverter 28 inverts a supplied voltage to provide the inverted signal to internal circuits of the device 20.

One of the advantages of the GTL system is that a wired-OR logic function can be implemented via a bus connection since the driver circuit (output circuit) uses a transistor of an open-drain type as shown in FIG. 1. Another advantage is that a logic state on the bus 10 is either high or low, and is fixed to high when all drivers sharing the bus 10 are turned off. On the other hand, tri-state bus systems such as CTT have a logic state which is an intermediate level between high and low when all drivers are turned off. The input buffer circuit connected to the bus 10 thus receives a signal which cannot be determined as either high or low, and goes into an unstable state randomly detecting highs and lows depending on underlying noise. In order to avoid this, CTT systems need a command to prohibit operations of the input buffer circuits when all the drivers are tuned off.

A disadvantage of the GTL system is a generation of ringing waveforms after turning off of the drivers. Such ringing waveforms are created when a distance between the bus 10 and the driver transistor 22 is long (i.e., the stub 11 is long). For example, a signal frequency of 200 MHz and a length of the stub 11 above 2 mm create large ringing waveforms. Such ringing waveforms become apparent especially when there is parasitic inductance in lead frames and bonding wires.

FIG. 2 is an illustrative drawing showing parasitic inductances $L_1$ and $C_1$ present in lead frames and bonding wires. In FIG. 2, turning off of a switch S, which models the driver transistor 22, generates a counterelectromotive force because of sudden cutting off of an electric current, resulting in a voltage pulse heading toward the bus 10 via the stub 11. Since an intersection between the stub 11 and the bus 10 has an impedance mismatch, this voltage pulse is reflected at the intersection between the stub 11 and the bus 10, returning to the driver transistor 22 via the stub 11. The turned-off driver transistor 22 forms an open end, so that the voltage pulse is subjected to a 100% reflection to return to the stub 11. There reflections are repeated, thereby creating intense ringing waveforms between the driver transistor 22 and the intersection of the stub 11 with the bus 10.

FIGS. 3A through 3D are charts showing computer-simulated ringing waveforms. FIG. 3A shows a case in which a stub length is zero. FIG. 3B shows a case in which a stub length is 1 cm. FIG. 3C is a case of the stub length being 2 cm, and FIG. 3D is a case in which the stub length is 5 cm.

FIG. 4 is an illustrative drawing showing conditions of the computer simulations. The computer simulations envisage a case where a driver DV writes data into a memory $M_1$ by using a signal frequency of 100 MHz under conditions that the driver DV and eight memories $M_1$ through $M_8$ are connected to a two-way data bus.

In FIGS. 3A through 3D, solid lines show waveforms at a driver end of the driver DV which writes the data into the memory $M_1$, and dashed lines show waveforms at a receiver end of the memory $M_1$. As shown in FIGS. 3A through 3D, the longer the stub length, the more intense the ringing waveforms.

In order to suppress the ringing waveforms, the driver transistor 22 can be controlled so as to achieve slow turning off. The damping circuit 21 of FIG. 1 is provided for this purpose, and controls the driver transistor 22 to carry out slow turning off. The use of such a damping circuit 21, however, places a cap on a maximum operation frequency of the device 20, and, thus, is not preferable.

In light of these, a conventional technique for suppressing the ringing waveforms is to make the stub 11 short enough. Sufficient suppression of the ringing waveforms, however, requires the device 20 to be directly connected to the bus 10 by removing the stub 11. If the device 20 is a memory IC, for example, the memory IC thus needs to be directly connected to bus wires on a mother board. In this case, memory ICs cannot be used in a module form. That is, since the memory ICs are directly connected to the bus wires, the memory ICs cannot be attached or detached freely. Expansion of memory ICs through attachment of new memory ICs, for example, thus become impossible.

Further, another problem arises if the memory ICs are directly attached to the bus 10 by removing the stub 11. This problem is that a so-called shrink technology for reducing the size of memory chips cannot be used. Memory-chip manufacturers generally achieve cost cuts by reducing the size of memory chips. A reduction in the size of a memory chip, however, requires an increase in the length of lead frames connecting between a memory chip inside a package and pins provided outside the package, and this increase in the lead-frame length should be achieved without changing wire arrangements on the mother board. The increase in the lead-frame length therefore ends up creating stubs. In other words, the shrink technology cannot be used when memory ICs are directly connected to a bus.

Another disadvantage of the GTL system is that the relatively low termination voltage of 1.2 V temporarily creates a signal level on the bus having an intermediate voltage level between the high level and the low level. This intermediate voltage level is observed at an instance between when a given device produces a low output and when another device is selected to replace the given device to output a low level.

FIGS. 5A through 5D are illustrative drawings for explaining a process in which an intermediate voltage level is created on a bus. At an initial state as shown in FIG. 5A, driver D1 is selected to be in an on-state (low-output state) among drivers D1 and D2 connected to the bus 10. In this state, the bus 10 is kept at a low voltage (0.4 V), and a receiver R detects this low voltage. The driver D1 has a current amount of 32 mA flowing therethrough.

Then, as shown in FIG. 5B, the driver D1 is unselected and turned off, and the driver D2 is selected to be an on-state (low-output state). In this state, the bus 10 is pulled up to the high voltage (1.2 V) in a proximity of the driver D1 by a termination resistance Rt1. This high voltage is detected by the receiver R. In this state, however, information that the driver D1 is turned off has not yet reached the position of the driver D2. Namely, the high voltage pulled up by the termination resistance Rt1 has not yet reached the position of the driver D2. The bus 10 in proximity of the driver D2 thus still remains at a low voltage (0.4 V), with an insufficient current amount (less than 32 mA) flowing through the driver D2. In the proximity of the driver D2, a current provided from a termination resistance Rt2 flows into the driver D2, and, at the same time, flows toward the driver D1 which on appearance remains at the on-state. This situation is equivalent to that in which both the drivers D1 and D2 are on, thereby producing a voltage lower slightly than 0.4 V on the bus 10 in the proximity of the driver D2.

FIG. 5C shows a state slightly after the state of FIG. 5B, where the high voltage pulled up by the termination resistance Rt1 after the turning off of the driver D1 has reached the position of the driver D1. In this state, the off-state of the device D1 is observed at the position of the driver D2, so that the driver D2 is provided with the sufficient current amount (32 mA) and is fully turned on. Also, the voltage on the bus 10 becomes the low voltage (0.4 V) in the proximity of the driver D2. However, the receiver R has not yet received the information that the driver D2 is fully turned on. Namely, this is a state in which the information that the driver D1 is turned off reached the position of the driver D2, and is returning back on the bus 10 toward the receiver R. The state that the receiver R can detect is that the driver D1 is off and the driver D2 is half turned on. The voltage on the bus 10 in the proximity of the driver D1 becomes an intermediate level between the high level and the low level.

FIG. 5D shows a stabilized state in which the driver D1 is off and the driver D2 is on. In this state, the information that the driver D2 is fully turned on reaches across the entire bus 10, so that the voltage on the bus 10 and the voltage which the receiver R detects become the low voltage (0.4 V).

In this manner, the bus 10 shows the intermediate voltage level for a short instance.

FIG. 6 is a chart showing an appearance of the intermediate voltage level in a computer simulation. A waveform shown in FIG. 6 is detected by the receiver R, and has the intermediate voltage levels appearing for an instance between the high level and the low level, as indicated by arrows. As is understood from the above description, the receiver R cannot avoid detecting the high voltage for an instance. The intermediate voltage level following the high voltage, however, further limits the speed of switching operations switching from the driver D1 to the driver D2. Namely, the system's operation should wait for a period T1 shown in the figure, because the period T1 does not have correct signal levels on the bus.

The generation of the intermediate voltage level can be avoided by raising the termination voltage of the bus 10 from 1.2 V to approximately 2.5 V. Use of the 2.5-V termination voltage, for example, results in a high voltage being applied to the drains of the drivers D1 and D2. The driver D2 thus has a sufficient current amount (32 mA) flowing therethrough even at the state shown in FIG. 5B. This means that the driver D2 is fully turned on from the beginning to draw in a sufficient current amount, thereby producing no intermediate voltage level on the bus. In this manner, if the driver transistors operate within such a range that the driver transistors become a constant current source when turned on, the problem of the intermediate voltage level can be avoided.

The use of such a termination voltage as 2.5 V in the GTL system, however, is not preferable because such a high voltage brings about an increase in power consumption of the drivers.

Accordingly, there is a need, in the data-transmission system using open-drain-type drivers and a bus provided with termination resistances, for a technique which suppresses ringing created by turning off of the drivers without shortening a stub length.

Also, there is a need, in the data-transmission system using open-drain-type drivers and a bus provided with termination resistances, for a technique which eliminates an intermediate voltage level appearing during the time of device switching by raising a termination voltage without incurring an increase in power consumption of devices.

SUMMARY OF THE INVENTION

Accordingly, it is a general object of the present invention to provide a technique which can satisfy the needs described above.

It is another and more specific object of the present invention to provide a technique which suppresses ringing created by turning off of the drivers without shortening a stub length.

In order to achieve the above objects according to the present invention, a signal-transmission system includes signal-transmission lines connected to a terminal voltage via terminal resistances, open-drain-type transistors outputting signals to the signal-transmission lines, branch lines stemming from the signal-transmission lines to connect the open-drain-type transistors with the signal-transmission lines, and insertion resistances inserted in the branch lines in proximity of the signal-transmission lines.

The signal-transmission system described above provides the insertion resistances inserted in the branch lines stemming from the signal-transmission lines. These insertion resistances can provide impedance matching between the signal-transmission lines and the branch lines to suppress signal reflections at intersections between the signal-transmission lines and the branch lines. This leads to a suppression of intense ringing waveforms which are created by turning off of drivers, thereby achieving reliable and high-speed signal transmission. Further, the use of the insertion resistances brings about a reduction in power consumption in the driver transistors.

It is yet another object of the present invention to provide a technique which eliminates an intermediate voltage level appearing during the time of device switching by raising termination voltage without incurring an increase in power consumption of devices.

In order to achieve the aforementioned object according to the present invention, the signal-transmission system described above has the termination voltage ranging between 2.0 V and 2.5 V.

The use of the termination voltage near 2.5 V achieves an elimination of the intermediate voltage level in the signal-transmission system based on the open-drain-type transistors and the termination voltage. Despite the high termination voltage, the driver transistors can avoid an increase of power consumption because the inserted resistances reduce a voltage applied to the driver transistors.

Other objects and further features of the present invention will be apparent from the following detailed description when read in conjunction with the accompanying drawings.

DETAILED DESCRIPTION OF THE PREFERRED EMBODIMENTS

In the following, a principle and embodiments of the present invention will be described with reference to the accompanying drawings.

Figure 1:
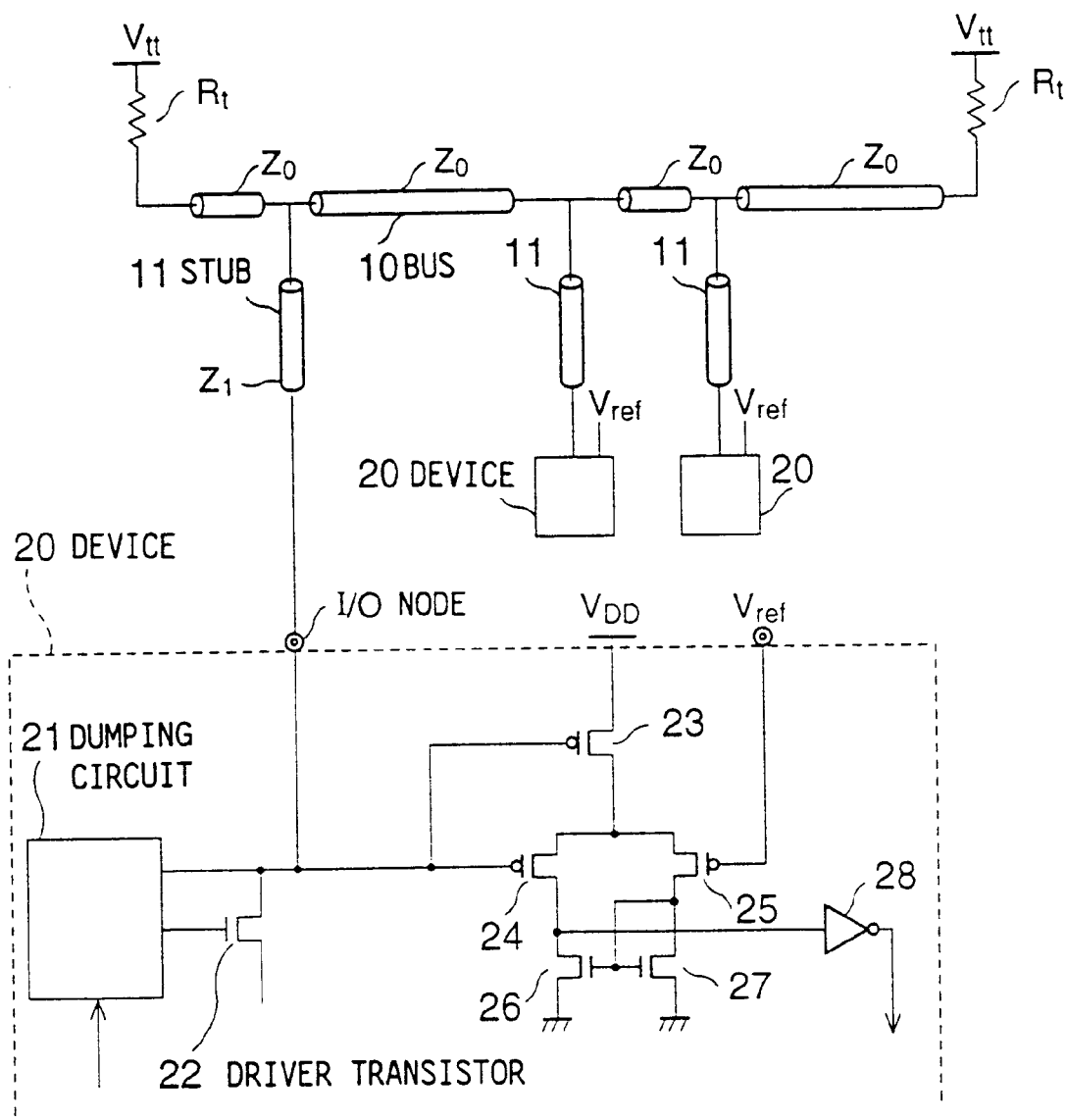
FIG. 1 is an illustrative drawing showing a GTL system.
Figure 2:
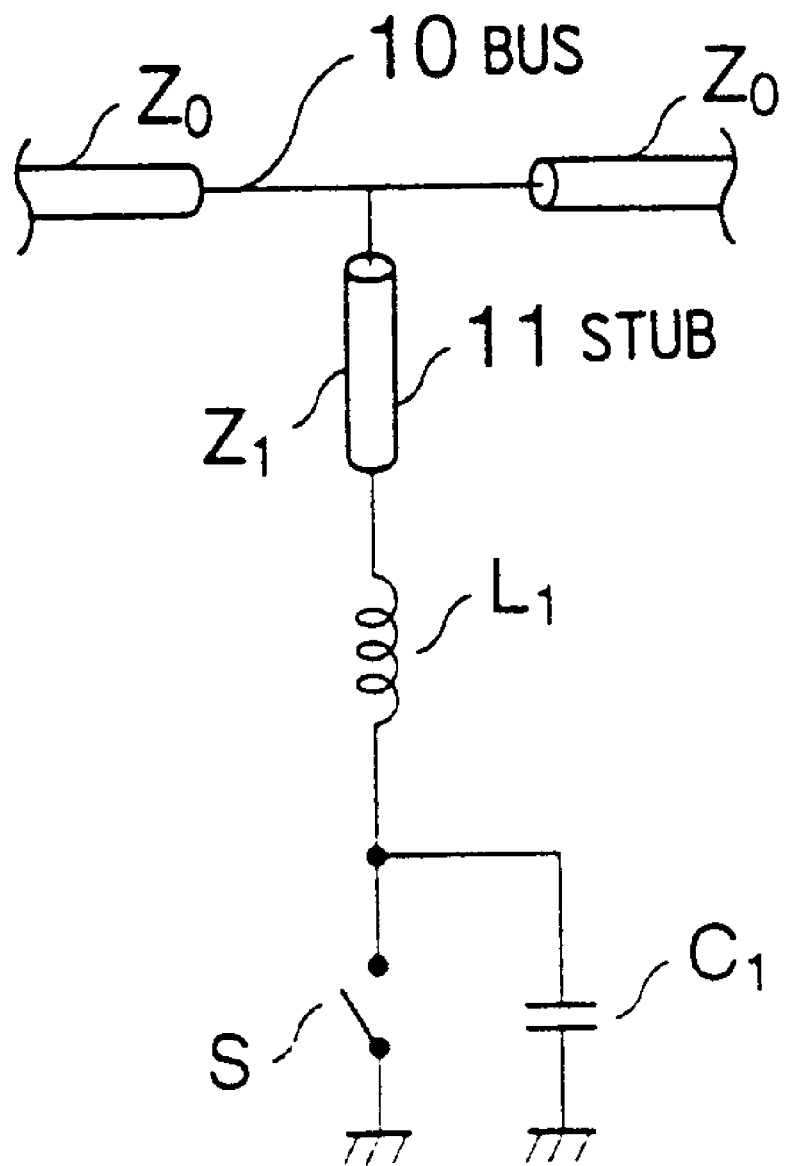
FIG. 2 is an illustrative drawing showing parasitic inductances which are present in lead frames and bonding wires.
Figure 3A:
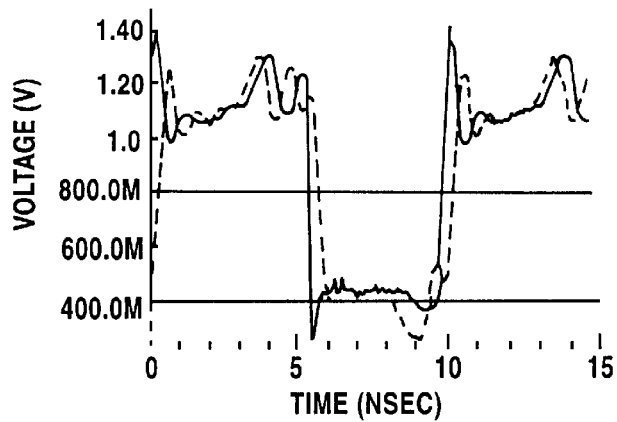
FIGS. 3A through 3D are charts showing computer-simulated ringing waveforms.
Figure 3B:
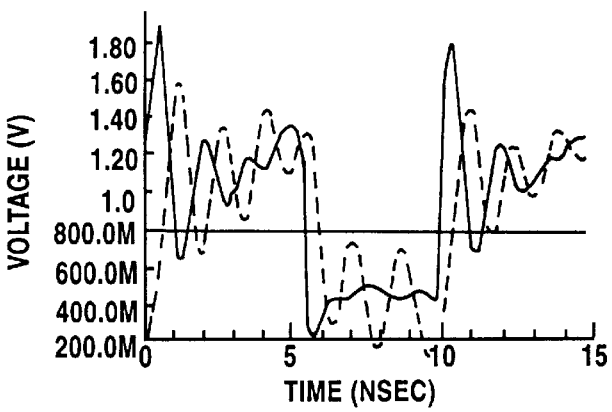
Figure 3C:
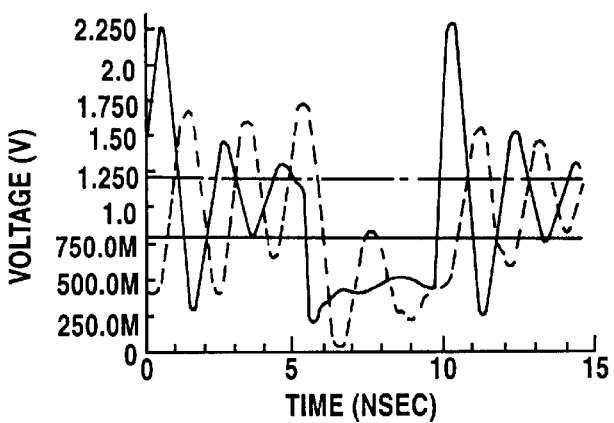
Figure 3D:
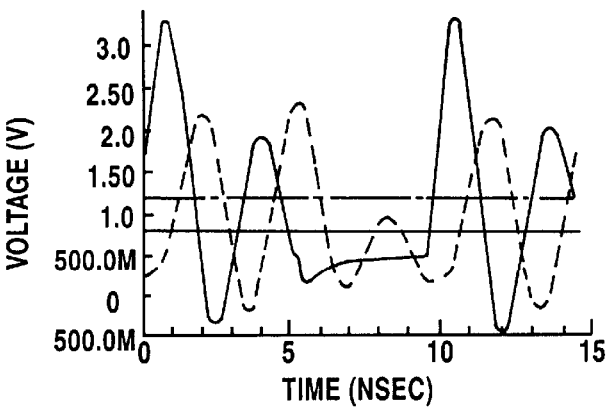
Figure 4:
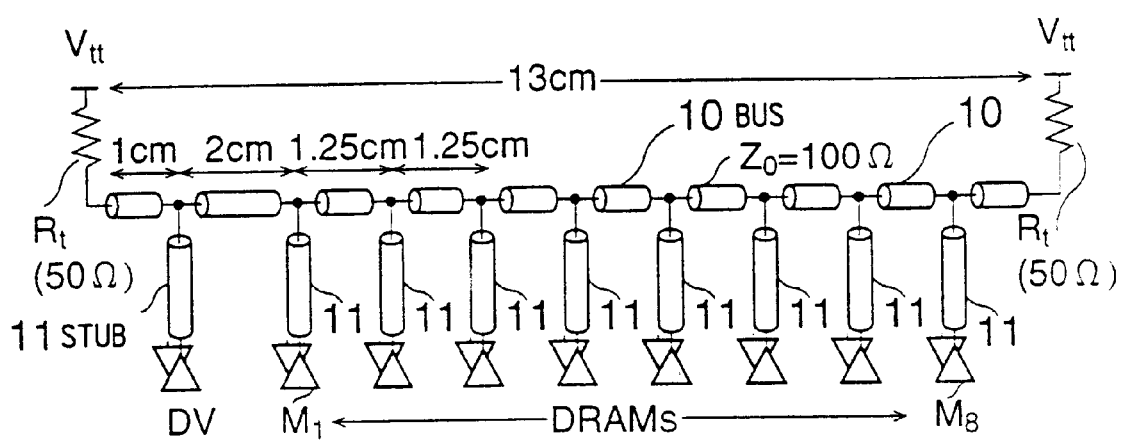
FIG. 4 is an illustrative drawing showing conditions of the computer simulations.
Figure 5A:
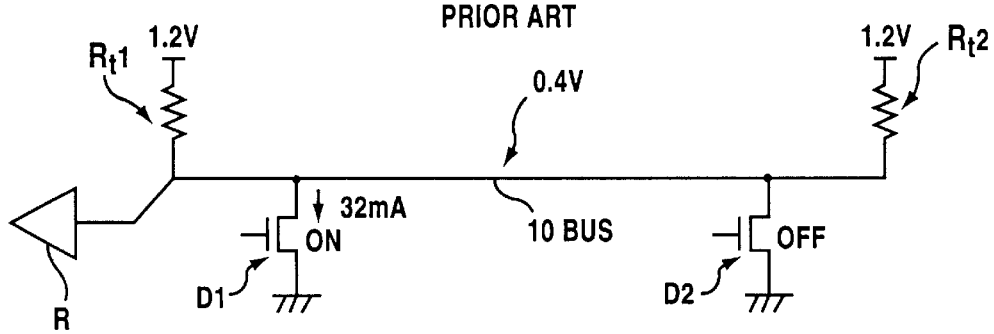
FIGS. 5A through 5D are illustrative drawings for explaining a process in which an intermediate voltage level is created on a bus.
Figure 5B:
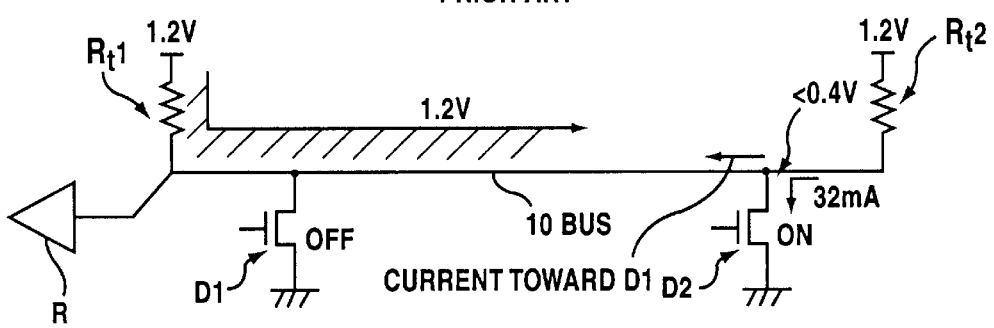
Figure 5C:
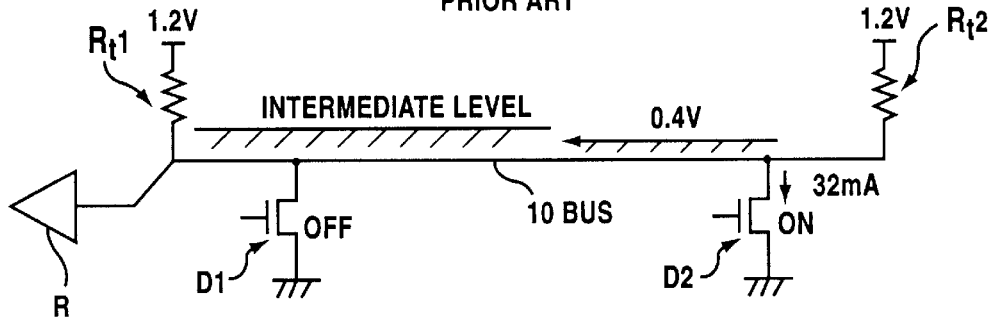
Figure 5D:
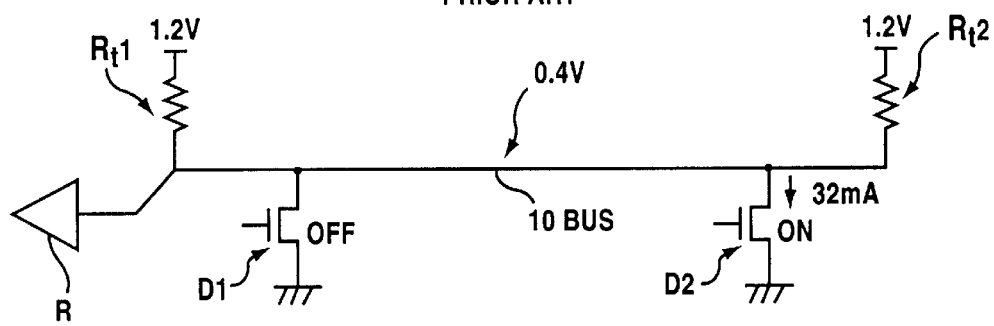
Figure 7:
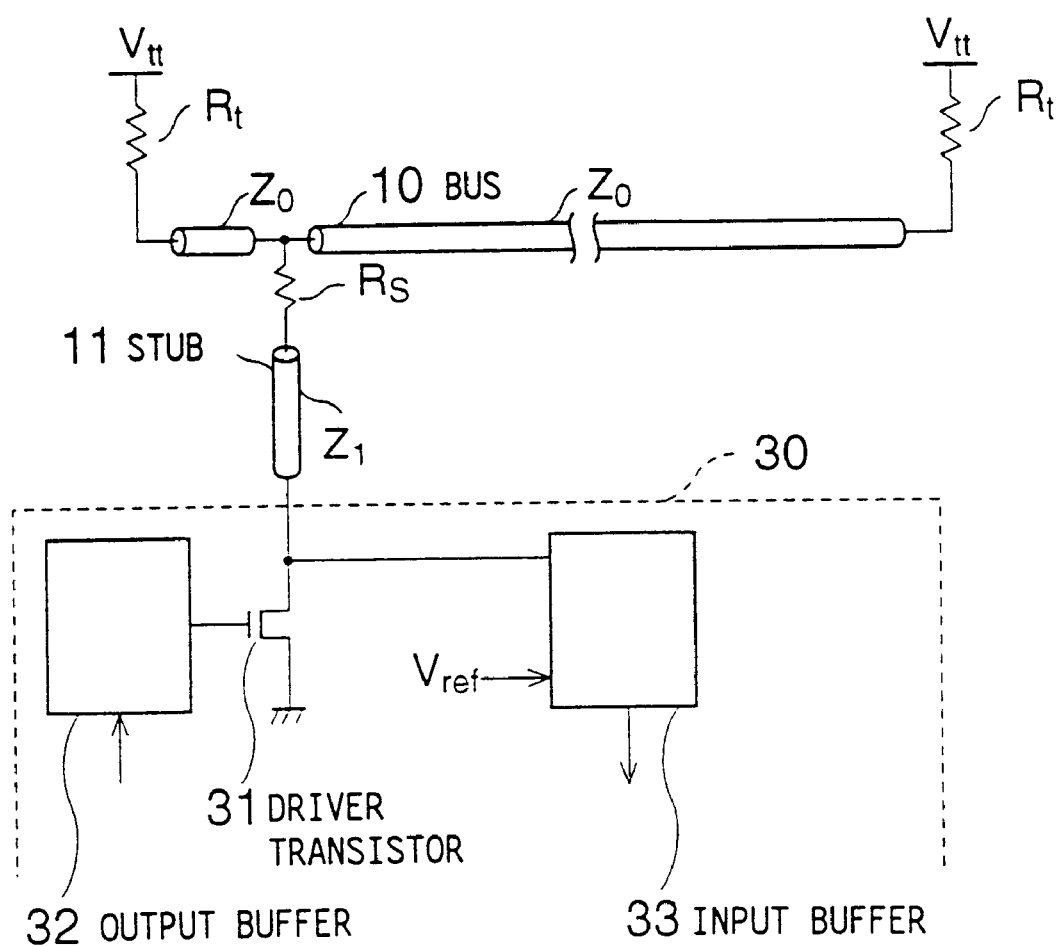
FIG. 7 is an illustrative drawing showing a bus-transmission system according to a principle of the present invention.

FIG. 7 is an illustrative drawing showing a bus-transmission system according to a principle of the present invention. In FIG. 7, the same elements as those of FIG. 1 are referred to by the same numerals, and a description thereof will be omitted.

The bus-transmission system of FIG. 7 includes the bus 10 and a series-connection resistance Rs provided in a series connection between the bus 10 and the stub 11. A device 30 connected to the bus 10 includes a driver transistor 31 of the open-drain type having a drain thereof connected to the stub 11, and further includes an output buffer 32 and an input buffer 33.

The series-connection resistance Rs is set to such a value that makes a characteristic impedance when viewing the bus 10 from the stub 11 match with a characteristic impedance of the stub 11. The stub 11 has the characteristic impedance $Z_1$, and the characteristic impedance when viewing the bus 10 from the stub 11 is a sum of the series-connection resistance Rs and a characteristic impedance of the bus 10 extending in both directions from the stub 11. Since the bus 10 has the characteristic impedance $Z_0$, the characteristic impedance of the bus 10 extending in both directions is $Z_0/2$. Therefore, the value of the series-connection resistance Rs is set as:

$$Rs=Z_1-Z_0/2 \qquad (1)$$

The insertion of this series-connection resistance Rs prevents a signal reflected at a device end from being reflected again when reaching the bus 10 from the stub 11, because an impedance matching is in place between the stub 11 and the paths beyond. Because of this, ringing waveforms as shown in FIGS. 3A through 3F are not generated. For the purpose of suppressing the ringing, the series-connection resistance Rs is preferably inserted at a position as close as possible to a branch point at which the branch path (stab 11) stems from the bus 10.

Figure 6:
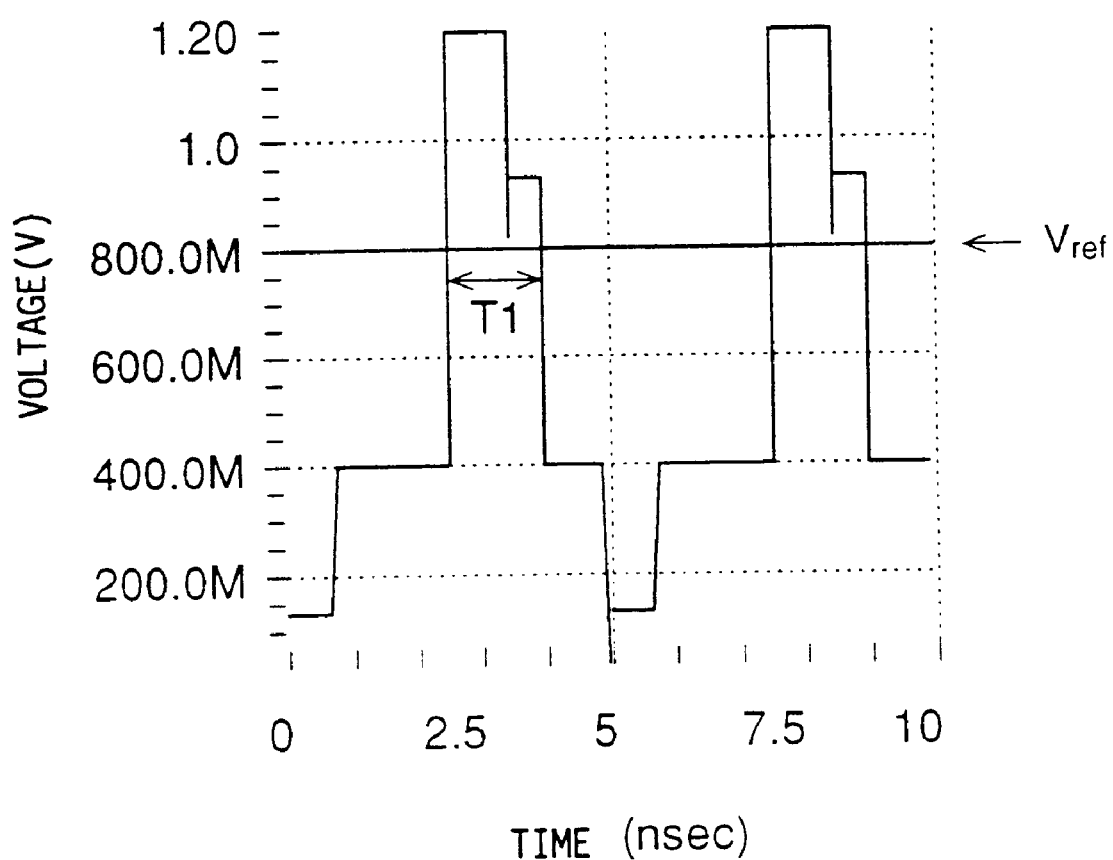
FIG. 6 is a chart showing an appearance of the intermediate voltage level in a computer simulation.

Further, the insertion of the series-connection resistance Rs can suppress the voltage applied to the driver transistor 31, which is beneficial when a voltage higher than the 1.2-V termination voltage of GTL is used as the termination voltage Vtt. The suppression of this voltage enables a reduction of power consumption in the driver transistor 31 to about the same level as that of GTL. Such reduction of the power consumption in the driver transistor 31 is desirable when heat release from a chip bearing the device 30 is taken into consideration. It is noted that since the termination voltage of the bus-transmission system of FIG. 7 can be higher than that used in GTL, the intermediate voltage level as shown in FIG. 6 is eliminated without incurring an increase in power consumption.

In general, the series-connection resistance Rs is preferably set to 25 Ω, with the characteristic impedance $Z_0$ of the bus 10 being 50 Ω and the characteristic impedance $Z_1$, of the stub 11 being 50 Ω. In practice, the series-connection resistance Rs within a range of −50% to +100% of $(Z_1-Z_0/2)$ can effectively suppress the ringing. Also, it is preferable to set the series-connection resistance Rs to between 24 Ω and 51Ω when the termination resistance Rt ranges between −50% and +100% of the characteristic impedance $Z_0$ and the termination voltage Vtt falls within a range of 2.5 V±0.25 V. These conditions are preferred in view of impedance-matching conditions and bus driving power. The value of the series-connection resistance Rs is not so critical to signal waveforms on the bus 10.

FIGS. 8A through 8D are charts showing computer-simulated waveforms when the series-connection resistance Rs is inserted, with other conditions being the same as those of FIGS. 3A through 3D. Here, the termination voltage Vtt is 2.5 V, and the series-connection resistance Rs is 25 Ω.

Figure 8A:
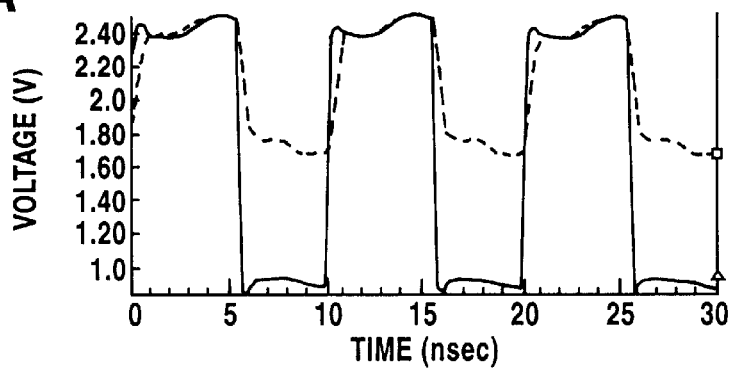
FIGS. 8A through 8D are charts showing computer-simulated waveforms when a series-connection resistance Rs is inserted.
Figure 8B:
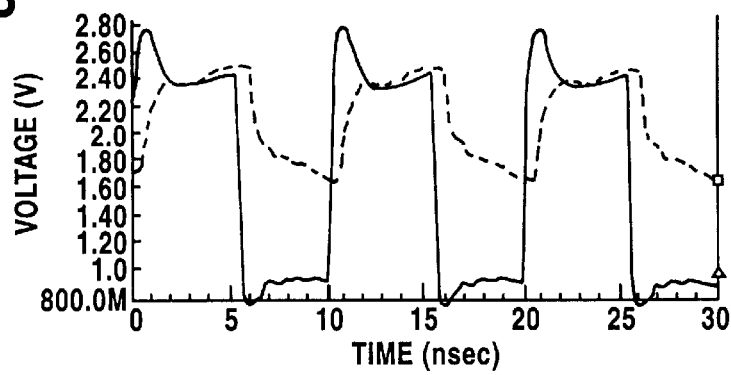
Figure 8C:
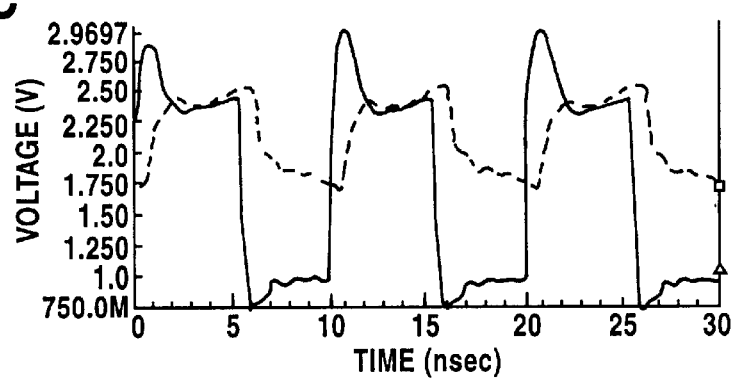
Figure 8D:
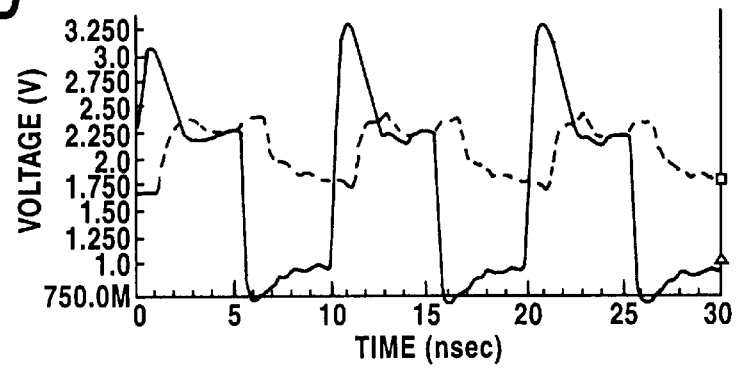

FIG. 8A shows a case in which the stub length is zero. FIGS. 8B through 8C correspond to the stub length of 1, 2, and 5 cm, respectively. Solid lines show waveforms at a driver end of the device DV which writes data into the memory, and dashed lines show waveforms at a receiver end of the memory. Showing clear differences from the computer simulations of the GTL system shown in FIGS. 3A through 3D, the insertion of the series-connection resistance Rs effectively suppresses the ringing. As can be seen in FIG. 8D, the system is operable even when the stub length is as long as 5 cm.

Even when the series-connection resistance Rs is inserted, waveforms at the driver end have an overshoot when the driver transistor is turned off to raise the voltage from the low level to the high level. This overshoot is prominent in FIGS. 8B through 8D. The GTL system of FIG. 1 uses the damping circuit 21 to suppress the overshoot at the expense of the operation speed. With the insertion of the series-connection resistance Rs in the present invention, however, there is no need to suppress the overshoot since ringing is not generated. Rather, the generation of overshoot is preferable because the overshoot can speed up the switching speed of an input buffer by achieving a faster transition of input signals. Namely, an inductance provided in series with the driver can speed up the detection of the input signals by raising a transitional voltage at the driver end at the time of switching off.

The above description has been provided by using an example in which the termination voltage Vtt is 2.5 V. This voltage level, 2.5 V, is quite proper as the termination voltage Vtt, and a reasoning justifying the use of this voltage level will be given below.

Sensitivity of an input receiver circuit (input buffer 33 of FIG. 7) is taken into account as one of restraining conditions. In consideration of the fact that the larger magnitude of input signals results in the faster operation of the input receiver circuit, the input signals need to have a magnitude at least ±0.2 V around a center voltage.

In order to ensure this condition of the input magnitude, output signals on the bus 10 need to have a magnitude of approximately ±0.4 V (0.8 V peak-to-peak). A high level of the output signals is the same as the termination voltage Vtt, so that the low level is equal to (Vtt–0.8 V). Namely, the voltage on the bus 10 is (Vtt–0.8 V) when the driver transistor 31 (FIG. 1) is turned on, and is Vtt when the driver transistor 31 is turned off. To achieve the magnitude of 0.8 V by switching the driver transistor 31, the driver transistor 31 needs a driving current of 32 mA (=0.8 V/(50/2) Ω) with the termination resistances Rt of 50 Ω.

When the driver transistor 31 is turned on, the voltage on the bus 10 is (Vtt–0.8 V), and a voltage drop at the series-connection resistance Rs (25 Ω) is 0.8 V (=32 mA×25 Ω). As a result, a drain voltage of the driver transistor 31 is (Vtt–1.6 V). In other word, the termination voltage Vtt needs to be higher than the drain voltage by approximately 1.6 V.

In order to have a sufficient driving power, the driver transistor 31 needs the drain voltage ranging between 0.4 V and 0.9 V. Since the termination voltage Vtt should be 1.6 V higher than the drain voltage, an appropriate range of the termination voltage Vtt is between 2.0 V to 2.5 V.

In practice, the drain voltage of the driver transistor 31 is preferably closer to 0.9 V than to 0.4 V. One of the reasons is that the drain voltage closer to 0.9 V can bring about a higher driving power of the transistor, so that even a small transistor can produce a sufficient driving power falling within the desired range. Another reason is that when two transistors connected to the bus are simultaneously turned on (this occurs at the time of switching outputting devices), use of a higher drain voltage makes it easier to provide a sufficient current to both the transistors.

Accordingly, the most preferable termination voltage Vtt is 2.5 V. If a voltage higher than 2.5 V is used, performance would be further enhanced, but power consumption becomes undesirably large. In consideration of these factors, the termination voltage Vtt is preferably within a range of 2.5 ±0.25 V in practice.

If demand for low power consumption is strong, the termination voltage Vtt is preferably set to 2.0 ±0.2 V by tolerating some deterioration in response speed. A voltage smaller than this range is not preferable since a sufficient driving power is not obtained due to the inserted series-connection resistance.

In the present invention, however, the termination voltage Vtt is not limited to 2.5 V or a proximity thereof. As will be described later in another embodiment, a ground voltage level may be used as the termination voltage Vtt by reversing the high-and-low relations of the voltage.

Figure 9:
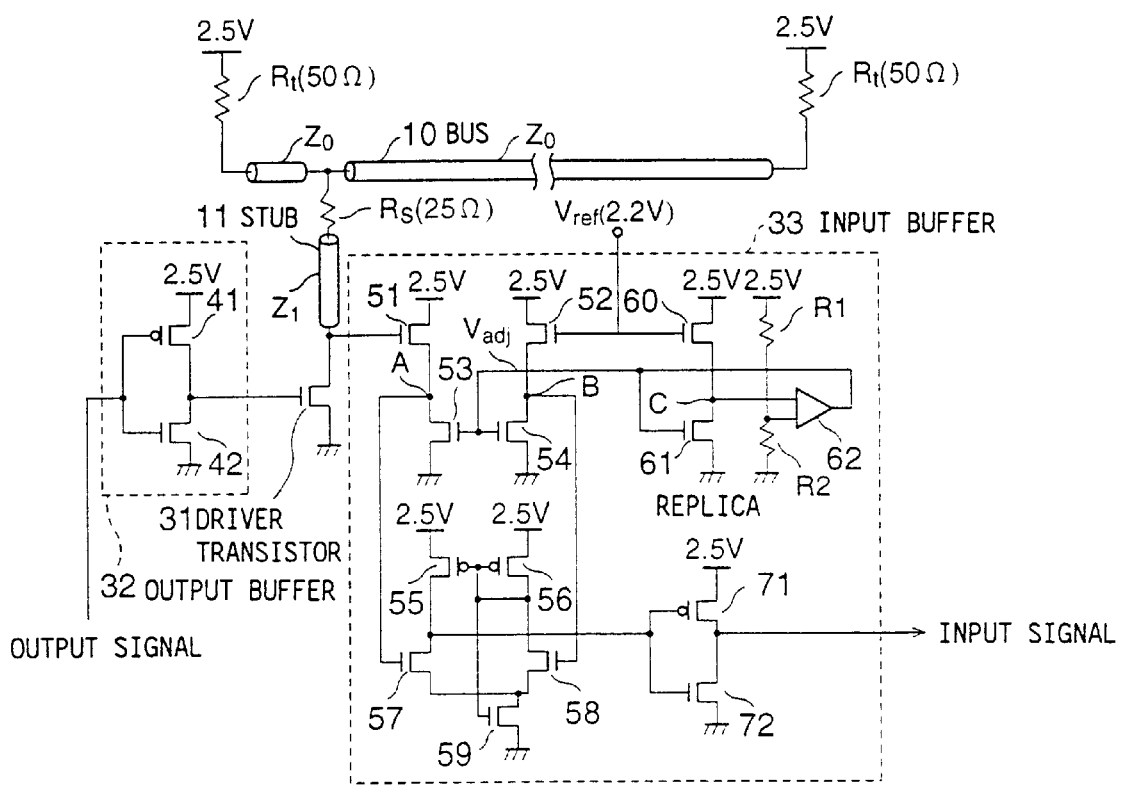
FIG. 9 is a circuit diagram of a bus-transmission system according to a first embodiment of the present invention.

FIG. 9 is a circuit diagram of a bus-transmission system according to a first embodiment of the present invention. In FIG. 9, the same elements as those of FIG. 7 are referred to by the same numerals, and a description thereof will be omitted.

In FIG. 9, the output buffer 32 includes a PMOS transistor 41 and an NMOS transistor 42. The PMOS transistor 41 and the NMOS transistor 42 together form an inverter circuit to invert a supplied output signal. This inverter circuit provides the gate of the driver transistor 31 with a low-level signal when the supplied output signal is high, so that the driver transistor 31 is turned off. When the supplied output signal is low, on the other hand, the inverter circuit feeds a high-level signal to the gate of the driver transistor 31 to turn the driver transistor 31 on.

The input buffer 33 includes NMOS transistors 51 through 54, PMOS transistors 55 and 56, NMOS transistors 57 through 61, a differential amplifier 62, resistances R1 and R2, a PMOS transistor 71, and an NMOS transistor 72. The NMOS transistors 51 through 54 together form a level-shifter circuit. The PMOS transistors 55 and 56 and the NMOS transistors 57 through 59 make up a differential amplifier. Further, the NMOS transistors 60 and 61, the differential amplifier 62, and the resistances R1 and R2 constitute an automatic level-adjustment circuit. This automatic level-adjustment circuit makes an automatic adjustment to a level shift amount of the level-shifter circuit. Finally, the PMOS transistor 71 and the NMOS transistor 72 together form an inverter.

The reason why the input buffer 33 is provided with a level-shift function is that input signals vary within a relatively narrow range around a center voltage of 2.2 V against a power voltage of 2.5 V used in the input buffer 33. When such input signals having a range closer to the power voltage are provided, an input buffer using a traditional differential amplifier (e.g., the input buffer of FIG. 1) cannot detect high or low of the input signals. In light of this, the input buffer 33 of FIG. 9 brings down the voltage levels of the input signals and the reference voltage level by using the level-shifter circuit, and uses the differential amplifier for detecting high or low of the level-shifted voltages.

In the level-shifter circuit comprising the NMOS transistors 51 through 54, each of the NMOS transistors 53 and 54 operates as a constant current source with a current amount being adjusted to a proper value by an adjustment voltage Vadj. A constant amount of current thus flows through the NMOS transistors 51 and 53, and the same amount of current flows through the NMOS transistors 52 and 54. Under these conditions, an input-signal voltage level applied to the gate of the NMOS transistor 51 and the reference voltage Vref applied to the gate of the NMOS transistor 52 are brought down by a threshold voltage of the NMOS transistors, and the level-shifted voltages appear at nodes A and B. These level-shifted voltages at the nodes A and B are then supplied to the differential amplifier provided at the next stage.

The adjustment voltage Vadj is created by the automatic level-adjustment circuit comprising the NMOS transistors 60 and 61, the differential amplifier 62, and the resistances R1 and R2. The resistances R1 and R2 together form a voltage dividing circuit to generate a target voltage for the level shift. If the level-shifter circuit described above is to bring down the reference voltage Vref (2.2 V) to 1.3 V, for example, this voltage dividing circuit needs to generate a voltage of 1.3 V. The NMOS transistors 60 and 61 form a replica of the NMOS transistors 52 and 54 of the level-shifter circuit. The differential amplifier 62 receives a voltage appearing at node C between the NMOS transistors 60 and 61 and the target voltage generated by the voltage dividing circuit. The differential amplifier 62 amplifies a difference between these two received voltages to generate the adjustment voltage Vadj. The adjustment voltage Vadj is supplied to the gate of the NMOS transistor 61 as a feedback. This feedback controls the voltage at the node C to become the same as the target voltage.

Accordingly, the adjustment voltage Vadj applied to the gate of the NMOS transistor 61 in the replica circuit is controlled such that the voltage at the node C in the replica circuit coincides with the target voltage. Such an adjustment voltage Vadj is supplied to the NMOS transistors 53 and 54 of the level-shifter circuit, so that the level-shifted voltage at the node B is the same as the target voltage.

The differential amplifier comprising the PMOS transistors 55 and 56 and the NMOS transistors 57 through 59 compares the level-shifted input signal and the level-shifted reference voltage Vref, and supplies an output to the inverter comprising the PMOS transistor 71 and the NMOS transistor 72. The inverter inverts the supplied signal to provide the inverted signal to internal circuits.

As described above, in the first embodiment, the level-shifter circuit shifts the levels of the input signal voltage and the reference voltage, and the differential amplifier compares the level-shifted voltages with each other to detect high or low of the input signal. In doing so, the level-shifted reference voltage of the level-shifter circuit is adjusted to the target voltage by the feedback control which controls the replica of the level-shifter circuit to generate the same voltage as the target voltage.

Figure 10:
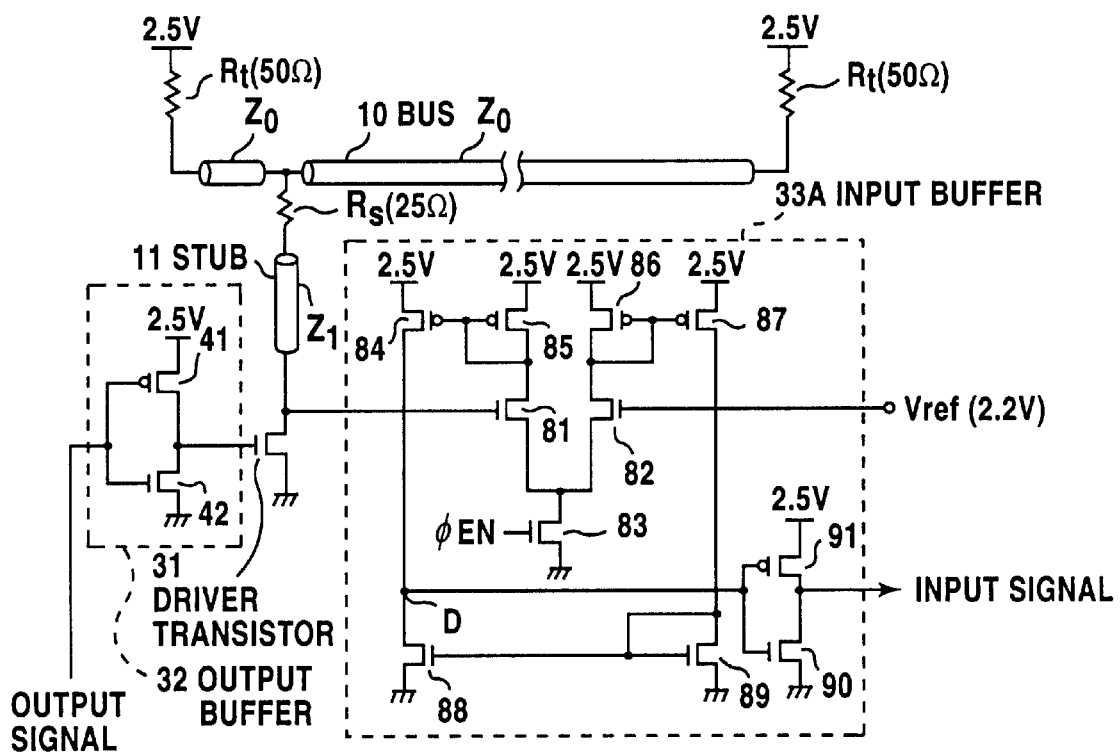
FIG. 10 is a circuit diagram of a bus-transmission system according to a second embodiment of the present invention.

FIG. 10 is a circuit diagram of a bus-transmission system according to a second embodiment of the present invention. In FIG. 10, the same elements as those of FIG. 9 are referred to by the same numerals, and a description thereof will be omitted.

An input buffer 33A of FIG. 10 includes NMOS transistors 81 through 83, PMOS transistors 84 through 87, NMOS transistors 88 through 90, and a PMOS transistor 91. The NMOS transistors 81 through 83 together operate as a differential amplifier. Each pair of the PMOS transistors 84 and 85 and the PMOS transistors 86 and 87 operates as a current mirror circuit. The PMOS transistors 84 and 87 and the NMOS transistors 88 and 89 serve as a circuit for converting an electric current into an electric voltage. The NMOS transistor 90 and the PMOS transistor 91 together form an inverter.

An input signal voltage applied to the gate of the NMOS transistor 81 is compared with the reference voltage Vref applied to the gate of the NMOS transistor 82. A voltage commensurate with a difference between the two voltages appears between the drains of the NMOS transistors 81 and 82. Since the input signal varies within a range close to the power voltage, however, the voltages appearing at the drains of the NMOS transistors 81 and 82 do not have a sufficient amplitude. Namely, these drain voltages varies within a narrow range around a high voltage because the gate voltages of the NMOS transistors 81 and 82 are high. Because of this, these drain voltages cannot be supplied to internal circuits as signal voltages.

Although the drain voltages of the NMOS transistors 81 and 82 have a small amplitude, a current flowing through each of these transistors varies with a sufficient amplitude. In light of this, the second embodiment supplies the drain currents to a current-to-voltage converting circuit via the current mirror circuits, rather than using the drain voltages with an insufficient amplitude. This current-to-voltage converting circuit converts changes in the drain currents into large amplitude changes in voltage.

As shown in FIG. 10, the drain of the NMOS transistor 81 is connected to the current input (gate input) of the current mirror circuit comprising the PMOS transistors 84 and 85. Also, the drain of the NMOS transistor 82 is connected to the current input (gate input) of the current mirror circuit comprising the PMOS transistors 86 and 87. The PMOS transistor 84 allows an electric current to flow therethrough in the same amount as the electric current flowing through the PMOS transistor 85. The same applies for the PMOS transistors 86 and 87. The current-to-voltage converting circuit comprising the PMOS transistors 84 and 87 and the NMOS transistors 88 and 89 generates a voltage at a node D in accordance with a difference between the currents flowing through the PMOS transistors 84 and 87. The voltage appearing at the node D is thus commensurate with a difference between the input signal voltage and the reference voltage Vref. Here, the drain voltages of the PMOS transistors 84 and 87 and the NMOS transistors 88 and 89 have enough room to vary with a sufficiently large amplitude. This voltage at the node D changes to a high level or to a low level, depending on whether the reference voltage Vref is larger than the input signal voltage.

The inverter comprised of the NMOS transistor 90 and the PMOS transistor 91 generates an inverted signal of the voltage of the node D, and supplies this inverted signal to the internal circuits.

As described above, the second embodiment addresses the problem of the detection of the input signals having a signal range close to the power voltage. This is achieved by supplying currents having a sufficient amplitude commensurate with the difference between the input signal voltage and the reference voltage to the current-to-voltage converting circuit via the current mirror circuits, and the current-to-voltage converting circuit converts these currents into a voltage having a sufficient amplitude. In this manner, a voltage signal with an amplitude amplifying the difference between the input signal voltage and the reference voltage is obtained, and is used for detecting high or low of the input signal voltage with reference to the reference voltage.

Figure 11:
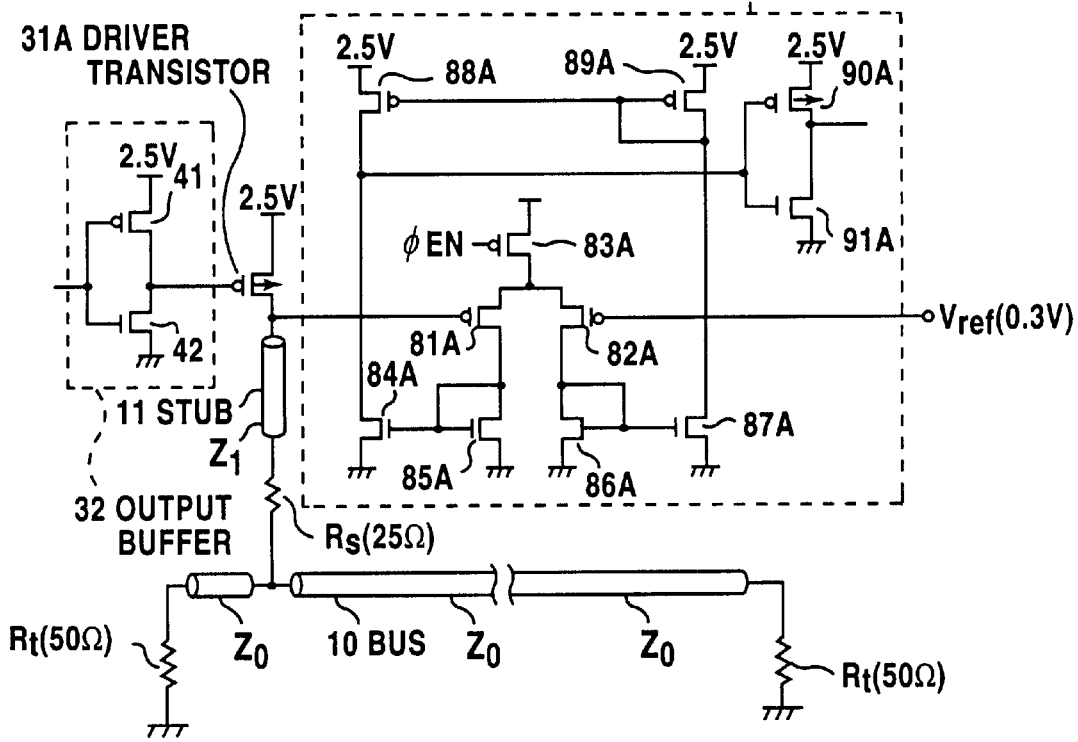
FIG. 11 is a circuit diagram of a bus-transmission system according to a third embodiment of the present invention.

FIG. 11 is a circuit diagram of a bus-transmission system according to a third embodiment of the present invention. In FIG. 11, the same elements as those of FIG. 10 are referred to by the same numerals, and a description thereof will be omitted.

The bus-transmission system of the third embodiment has reversed voltage relations with the second embodiment of FIG. 10. Namely, the bus-transmission system of FIG. 11 has the bus 10 whose terminations are connected to the ground via the 50-Ω termination resistances Rt. Further, a driver transistor 31A is a PMOS transistor, being changed from the NMOS transistor of FIG. 10. It is apparent that the configuration of FIG. 11 will produce the same results as in the previous embodiments in suppressing ringing and power consumption by use of the series-connection resistance Rs. This configuration providing termination as ground connections is advantageous in that a system design does not have to be changed even if the power voltage is changed in future designs.

An input buffer 33B of FIG. 11 includes PMOS transistors 81A through 83A, NMOS transistors 84A through 87A, PMOS transistors 88A through 90A, and an NMOS transistor 91A. The PMOS transistors 81A through 83A together operate as a differential amplifier. Each pair of the PMOS transistors 84A and 85A and the NMOS transistors 86A and 87A operates as a current mirror circuit. The NMOS transistors 84A and 87A and the PMOS transistors 88A and 89A serve as a circuit for converting an electric current into an electric voltage. The PMOS transistor 90A and the NMOS transistor 91A together form an inverter.

The input buffer 33B of FIG. 11 operates in the same manner as does the input buffer 33A of FIG. 10, and a description of the operation will be omitted. It should be noted that the reference voltage Vref applied to the input buffer 33B is 0.3 V, because the input signals in this case have a range close to the ground level centered around approximately 0.3 V.

As described above, the third embodiment of the present invention is directed to the case in which the bus termination is provided as connections to the ground and the input signals have a range centered around a voltage close to the ground level. The third embodiment supplies currents having a sufficient amplitude commensurate with the difference between the input signal voltage and the reference voltage to the current-to-voltage converting circuit via the current mirror circuits, and the current-to-voltage converting circuit converts these currents into a voltage having a sufficient amplitude. In this manner, a voltage signal with an amplitude amplifying the difference between the input signal voltage and the reference voltage is obtained, and is used for detecting high or low of the input signal voltage with reference to the reference voltage.

In the bus-transmission system of the present invention, the series-connection resistance Rs does not necessarily have to be inserted at a driver end of all the devices. Some devices may need long stubs, and others may need only short stubs. Insertion of the series-connection resistance Rs into the long stubs can achieve a reliable system operation even if the devices having short stubs are not provided with the series-connection resistance Rs.

In BGA (ball grid array) packages or PGA (pin grid array) packages, for example, long leads are necessary to connect I/O circuits arranged in perimeter portions of a semiconductor chip to output electrodes (balls or pins). The series-connection resistance Rs is preferably inserted for ringing suppression. On the other hand, a configuration in which a memory-chip package is vertically positioned to stand on a board can shorten stub length substantially. Such a memory-chip package of a vertical-mount type does not need the series-connection resistance Rs. Even in such a memory-chip package, however, use of the shrink technology to reduce the size of the memory chip inside the package results in increased stub lengths, thereby necessitating the insertion of the series-connection resistance Rs.

Figure 12:
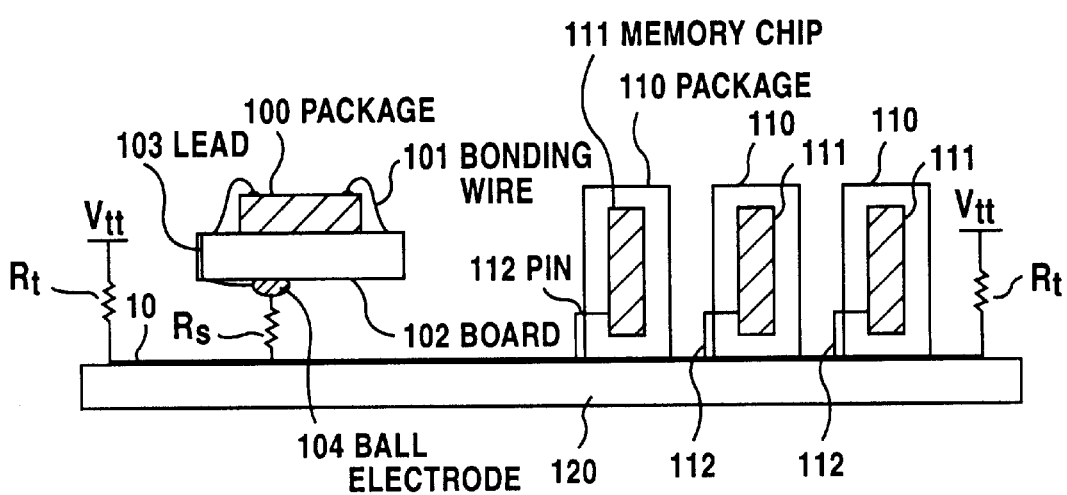
FIG. 12 is an illustrative drawing of a bus-transmission system according to a fourth embodiment of the present invention.

FIG. 12 is an illustrative drawing of a bus-transmission system according to a fourth embodiment of the present invention. In this embodiment, memories and a controller are provided. The controller is mounted on a BGA package, so that the series-connection resistance Rs is inserted. On the other hand, the memories are housed in the vertical-mount-type packages, so that no series-connection resistance Rs is provided.

The bus-transmission system of FIG. 12 includes the bus 10 connected to the termination voltage Vtt via the termination resistances Rt, a printed board 120 carrying the bus 10, a controller chip 100 mounted on the printed board 120 and connected to the bus 10, and a plurality of memory chips 111. The controller chip 100 is mounted on a board 102, and is connected to a ball electrode 104 via bonding wires 101 and a lead 103. The ball electrode 104 is connected via the series-connection resistance Rs to the bus 10. The bus 10 includes a plurality of wires, so that the ball electrode 104 and the series-connection resistance Rs are provided in the same number as the number of the wires of the bus 10. For the sake of simplicity of the drawing, however, elements for only one bus wire are shown in the figure.

Each of the memory chips 111 is housed in a memory package 110, and is connected to the bus 10 via an output pin 112. Since the output pin 112 has a short length, absence of the series-connection resistance Rs does not bring about a volatile ringing.

In this manner, the series-connection resistance Rs is provided for a chip if this chip is contained in a package such as a BGA package or a PGA package which needs long stubs. This configuration achieves reliable system operations without creating volatile ringing even if the series-connection resistance Rs is not provided for short stubs such as of the vertical-mount-type memory packages.

Figure 13:
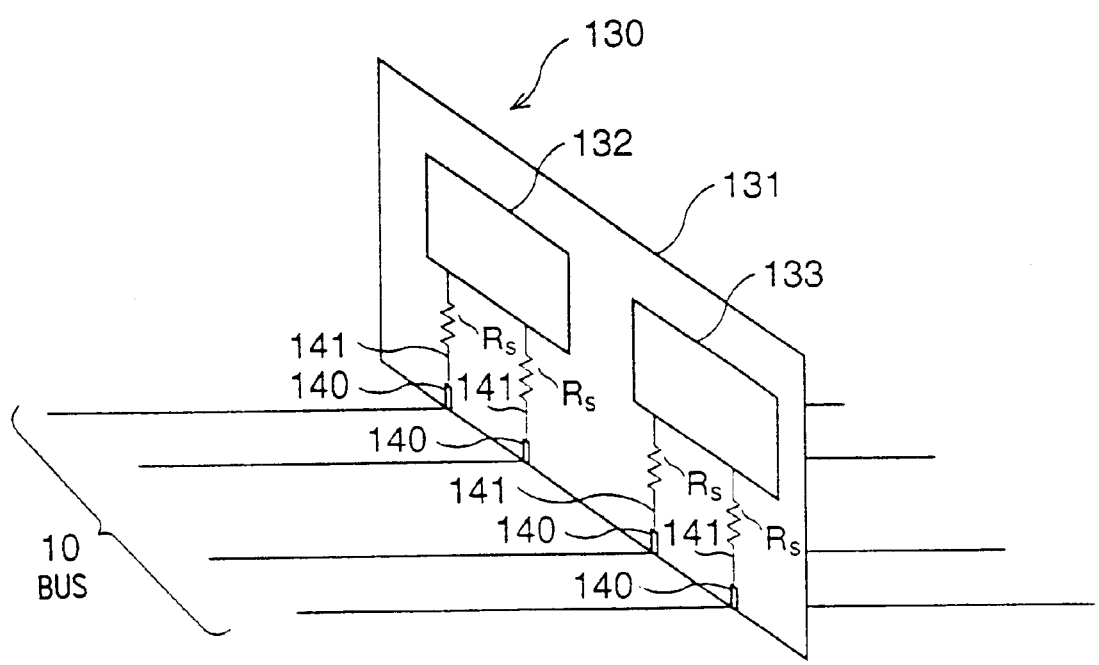
FIG. 13 is an illustrative drawing of a semiconductor-device module according to the present invention.

FIG. 13 is an illustrative drawing of a semiconductor-device module according to the present invention. The semiconductor-device module of the present invention has the series-connection resistances Rs inserted in wires (equivalent to stubs) running between electrodes arranged on one side of a printed board and chips mounted on the printed board. FIG. 13 envisages DIMM (dual-in-line-memory module), for example, and shows a DIMM 130 connected to the bus 10. The DIMM 130 includes a printed board 131, and, on the printed board 131, further includes memory chips 132 and 133, electrodes 140 for bus connection, wires 141 connecting between the electrodes 140 and the memory chips 132 and 133, and the series-connection resistances Rs inserted in the wires 140. Because of the inserted series-connection resistance Rs, ringing is suppressed, and chip power consumption is reduced.

As shown in FIG. 13, the semiconductor-device module such as DIMM or SIMM (single-in-line-memory module) with the series-connection resistance Rs inserted therein has constant signal-transmission characteristics, which do not vary even when the length of the wires 141 is changed following a size change of the chip mounted on the printed board. Manufacturers are free from restrains posed by ringing noise in the making of chips, so that the manufacturers can achieve cost cuts by applying the shrinking technology.

Further, the present invention is not limited to these embodiments, but various variations and modifications may be made without departing from the scope of the present invention.

What is claimed is:

1. An input buffer circuit for receiving a signal varying within a voltage range having a center thereof substantially closer to a power supply voltage than to a ground voltage, said input buffer circuit comprising:

a level-shift circuit shifting voltage levels of said signal and a reference voltage to produce a level-shifted signal voltage and a level-shifted reference voltage;

a target-voltage setting circuit which includes a replica circuit that imitates said level-shift circuit, and compares a predetermined target voltage with a copy of the level-shifted reference voltage generated by said replica circuit so as to produce a control voltage that is supplied to said level-shift circuit and fed back to said replica circuit to adjust the replica of the level-shifted reference voltage, thereby controlling an amount of level-shift generated by said level-shift circuit; and a differential-amplifier circuit amplifying a difference between said level-shifted signal voltage and said level-shifted reference voltage to output a signal reflecting the difference.

* * * * *